United States Patent
Zhu et al.

(10) Patent No.: US 8,482,256 B2
(45) Date of Patent: Jul. 9, 2013

(54) PORTABLE CHARGING POWER SYSTEM FOR BATTERY-POWERED DEVICES

(75) Inventors: Zuohang Zhu, Ottawa (CA); Andrew C. Kular, Ottawa (CA)

(73) Assignee: Ecosol Technologies Inc., Ottawa, Ontario (CA)

( * ) Notice: Subject to any disclaimer, the term of this patent is extended or adjusted under 35 U.S.C. 154(b) by 768 days.

(21) Appl. No.: 12/584,661

(22) Filed: Sep. 10, 2009

(65) Prior Publication Data
US 2010/0320971 A1 Dec. 23, 2010

Related U.S. Application Data

(60) Provisional application No. 61/191,716, filed on Sep. 11, 2008.

(51) Int. Cl.
*H02J 7/00* (2006.01)

(52) U.S. Cl.
USPC .......... 320/134; 361/91.1; 320/103; 320/112; 320/114; 320/135; 320/136

(58) Field of Classification Search
USPC .......... 320/103, 112, 114, 134–136; 361/91.1
See application file for complete search history.

(56) References Cited

U.S. PATENT DOCUMENTS

| | | | |
|---|---|---|---|
| 6,118,248 A * | 9/2000 | Gartstein et al. | 320/107 |
| 2008/0111521 A1 * | 5/2008 | So et al. | 320/137 |

* cited by examiner

*Primary Examiner* — Samuel Berhanu
(74) *Attorney, Agent, or Firm* — D. Peter Hochberg; Sean F. Mellino

(57) ABSTRACT

A portable power system which contains a battery, which is intended for use as a power source for charging the batteries of portable electronics devices or for powering other electrical systems. It contains a USB connection for power input and a myriad of adapters for connecting the power system with the proprietary connectors of portable devices, as well as a screen to output system information to the user. The power system also contains a microcontroller which controls internal systems, input and output current and voltage, such that the power system may operate with any portable device as well as any type of USB port.

19 Claims, 3 Drawing Sheets

PORTABLE CHARGING POWER SYSTEM FOR BATTERY-POWERED DEVICES

CROSS-REFERENCE TO RELATED APPLICATION

This application claims priority of U.S. Provisional Application No. 61/191,716, filed Sep. 11, 2008, under Title 35, United States Code, Section 119(e).

BACKGROUND OF THE INVENTION

1. Field of the Invention

The invention relates generally to battery-containing portable power systems and, more particularly, to battery-containing portable power systems for charging battery-powered portable devices.

2. Description of the Prior Art

Rechargeable battery-powered portable devices such as cellular telephones have, since their inception, been provided with proprietary adapters to provide power to their on-board rechargeable batteries. There is no standardization in the connectors between manufacturers or even devices of the same manufacturer, nor in the voltage and current required as input for these devices, as competition has led device manufacturers to produce proprietary connectors to prevent others from benefiting from their devices by selling adapters and to prevent consumers from easily switching from one device to another. This lack of standardization requires the consumer to carry more than one adapter if they are interested in charging portable devices from different manufacturers.

Adapters exist for connecting a rechargeable battery-powered device to some sort of auxiliary power, such as USB ports on computers, which may be connected to a cell phone, a personal digital assistant, or another device. These adapters, however, maintain a constant output voltage and do not take into account the voltage of the on-board battery of the cell phone or PDA, which is lower when it is nearly empty and higher as it nears full charge. Without accounting for this, the current may be too high for absorption by the battery and the excess current and power will be inefficiently lost in the form of heat. In any event, these adapters do not contain batteries and therefore they are not portable and are reliant on the presence of a wall electrical socket, a car electrical socket, a computer with a USB port or a USB/AC adapter which connects to a typical electrical wall socket and contains a USB port to which devices may be connected.

Portable power systems for portable devices which contain batteries exist but the batteries used are generally of the disposable variety. Those that allow the use of rechargeable batteries merely discharge the batteries into the portable device at the batteries' maximum rate, and do not manage the output current and voltage to keep the battery in its optimal operating range for safety, efficiency and longevity, nor do they contain redundant protection for the battery.

It is clear to those skilled in the art that there has been a longstanding need for a charging system that is self-contained, compatible with the myriad portable devices in the marketplace and capable of using a standard power sources such as USB, which is also electrically efficient and is able to effectively manage its battery for safety and long life.

SUMMARY OF THE INVENTION

The present invention provides a portable power system containing a rechargeable battery, intended for use as a power source for charging the rechargeable batteries of portable devices, such as cellular telephones, or for powering electrical systems. The power system contains an input connector which is able to interface with a USB (universal serial bus) port, which serves as the electrical power input, and may also be used to transmit data to a computer for diagnostics or general power statistics, for instance. The power system also contains an LCD screen which displays information about the battery's condition and a button which may be pushed by the user to cause the power system to display information or reset itself. The power is output from the power system's battery by means of an output connector, which is connected through an adapter to the proprietary input connector of a portable device requiring charging. There may be any number of such adapters, each matched to the proprietary input of a particular device or manufacturer.

The power system of the present invention also contains a microcontroller which controls internal systems, as well as the input and output voltage and current, enabling the power system to interoperate with any portable device as well as any type of USB port. These systems also ensure that the power system outputs its battery power in an efficient manner, all the while respecting the health of the on-board rechargeable battery. The power system determines the current battery capacity, and compares it to the original capacity. This determines the health of the battery, and the power system adjusts the maximum charging current that it may receive from the USB port, as well as the maximum output current that it may deliver to a portable device, based on the health of the battery. The charging current and output current are managed by the microcontroller. In the interests of efficiency and the well-being of the portable device, the power system also determines the maximum current that may be received by the output device, and adjusts the output current and voltage accordingly using an iterative algorithm. This maximizes the efficiency of the power system by ensuring that no useful electrical power is wasted as heat. The power system's input circuitry also identifies the type of USB port and permits the reception of a maximum current that may be output by the USB port and absorbed by the power system's battery, the latter which depends on the health of the battery. This is accomplished by incrementally increasing the current while monitoring the input voltage. When the input voltage is reduced by greater than 5%, the permitted input current reverts to the previous iteration and remains at that level.

BRIEF DESCRIPTION OF THE DRAWINGS

It will now be convenient to describe the invention with particular reference to one embodiment of the present invention. It will be appreciated that the figures relate to one embodiment of the present invention only and are not to be taken as limiting the invention.

DETAILED DESCRIPTION OF THE DRAWINGS

Definitions

The term "monitor means" is used to define a means by which a microprocessor gleans information about the system in order to make decisions, and would be known by a person skilled in the art to include input current and voltage monitors, output current and voltage monitors, battery monitors and temperature sensors, among others.

The term "control means" is used to define a means by which a microprocessor is able to control the flows of power to, from and through a power system, and would be known by a person skilled in the art to include MOSFET or other types of switches, resistors and current limiting switches, and DC/DC converters, among others.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
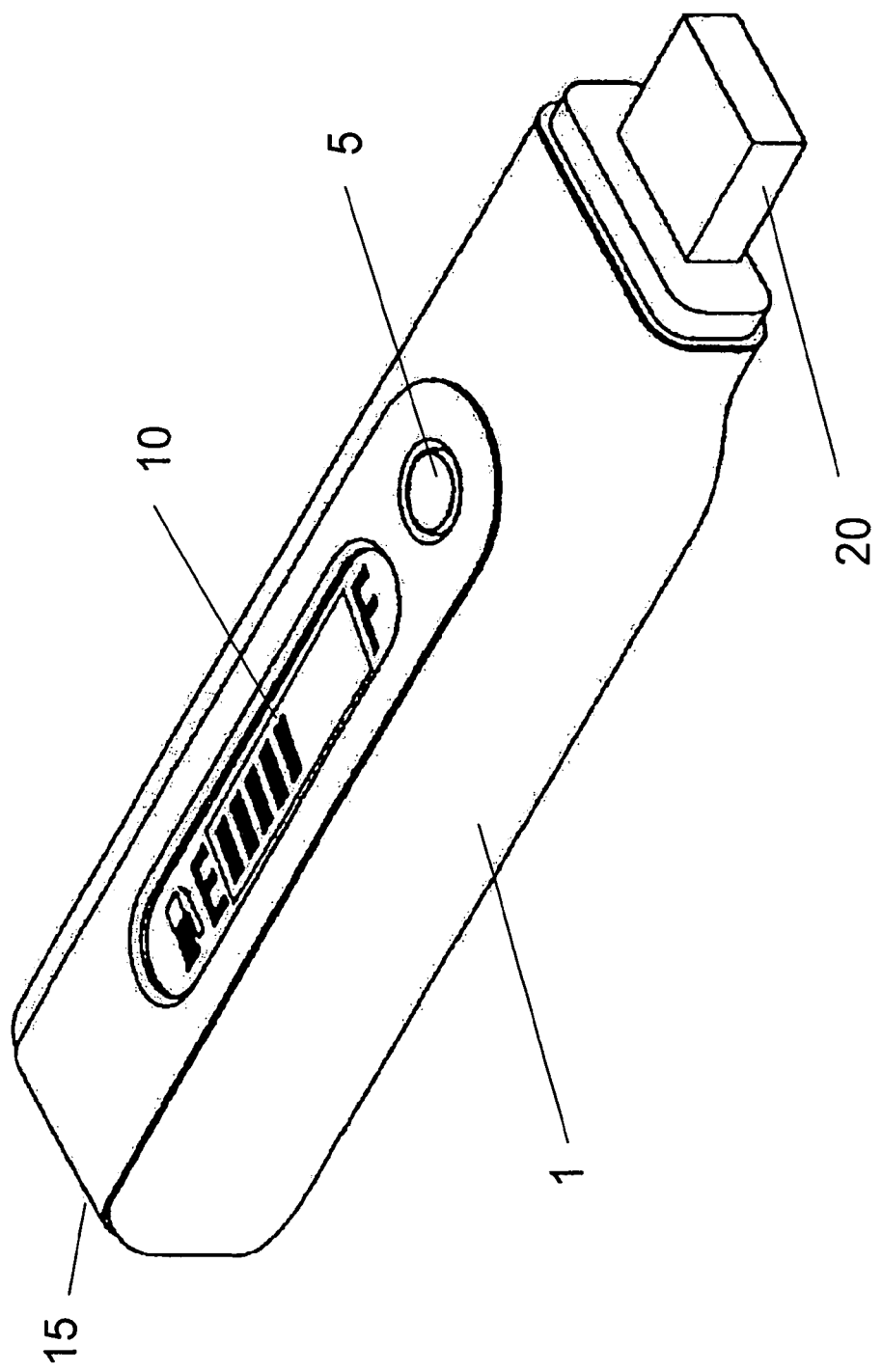
FIG. 1 is a perspective drawing showing the power system in accordance with the present invention.

With reference to FIG. 1 and according to one embodiment of the present invention, the power system is portable, contains a rechargeable battery, and is used predominantly to charge portable electronics devices such as laptop computers, cellular telephones, personal digital assistants, and other portable devices having a rechargeable battery. The power system is housed in housing 1, contains an input connector 20 at one end which serves as the electrical power input to the power system and an output connector 15 at the opposite end. In this embodiment the power system's input connector 20 interfaces with a USB port, but a person skilled in the art would know that interfacing with other power-emitting ports, such as a Firewire™ port would also be possible to achieve the same result. The input connecter 20 may transmit data to a computer, if connected to one, which may use the information for diagnostics or general power statistics, among other uses. The power system outputs electrical power by means of the output connector 15. The power system also contains an LCD screen 10 mounted on the top panel of housing 1, which may display various information about the battery's condition, among them battery power remaining, voltage, current, and temperature. In addition, a button 5 mounted adjacent to the LCD screen 10 may be pushed by the user to interact with the system and control the information output to the LCD screen 10. For instance, the button 5 may activate the LCD screen 10 to show the battery power remaining, or control what information is shown on the LCD screen 10. Holding the button 5 for an extended time resets the power system. Another display mode such as a series of LEDs may be substituted for the LCD screen 10, and another input device such as a dial may be substituted for the button 5, as may be appreciated by a person skilled in the art.

Figure 2:
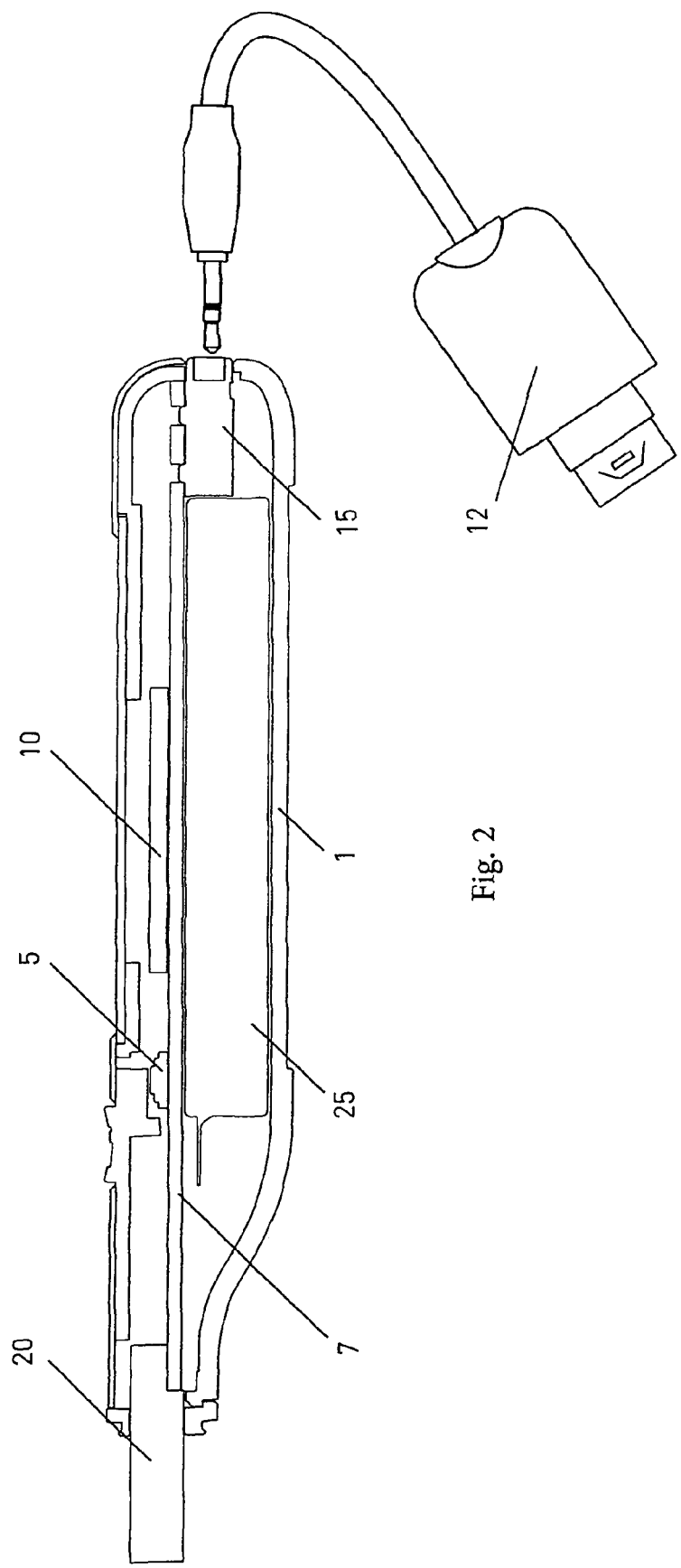
FIG. 2 is a side cut-away view of the power system in accordance with the present invention.

With reference to FIG. 2 and according to one embodiment of the present invention, the power is output from the power system's battery 25 through the output connector 15, which is connected through an adapter 12 to the proprietary input connector (not shown) of the portable electronics device requiring charging. As the shape of input connectors vary between manufacturers of portable electronics devices, there may be any number of such adapters, each matched to the proprietary input of a particular device or manufacturer. The system is managed by integrated circuits contained on a circuit board 7, which control the power inflow and outflow; chief among these is a microcontroller (not shown), which is a chip that is connected to the power system's sensors and is programmed by firmware to make decisions regarding the overall power management of the power system. The microcontroller's firmware may be replaced by a hard-wired circuit map, and achieve the same results, as may be appreciated by a person skilled in the art.

Figure 3:
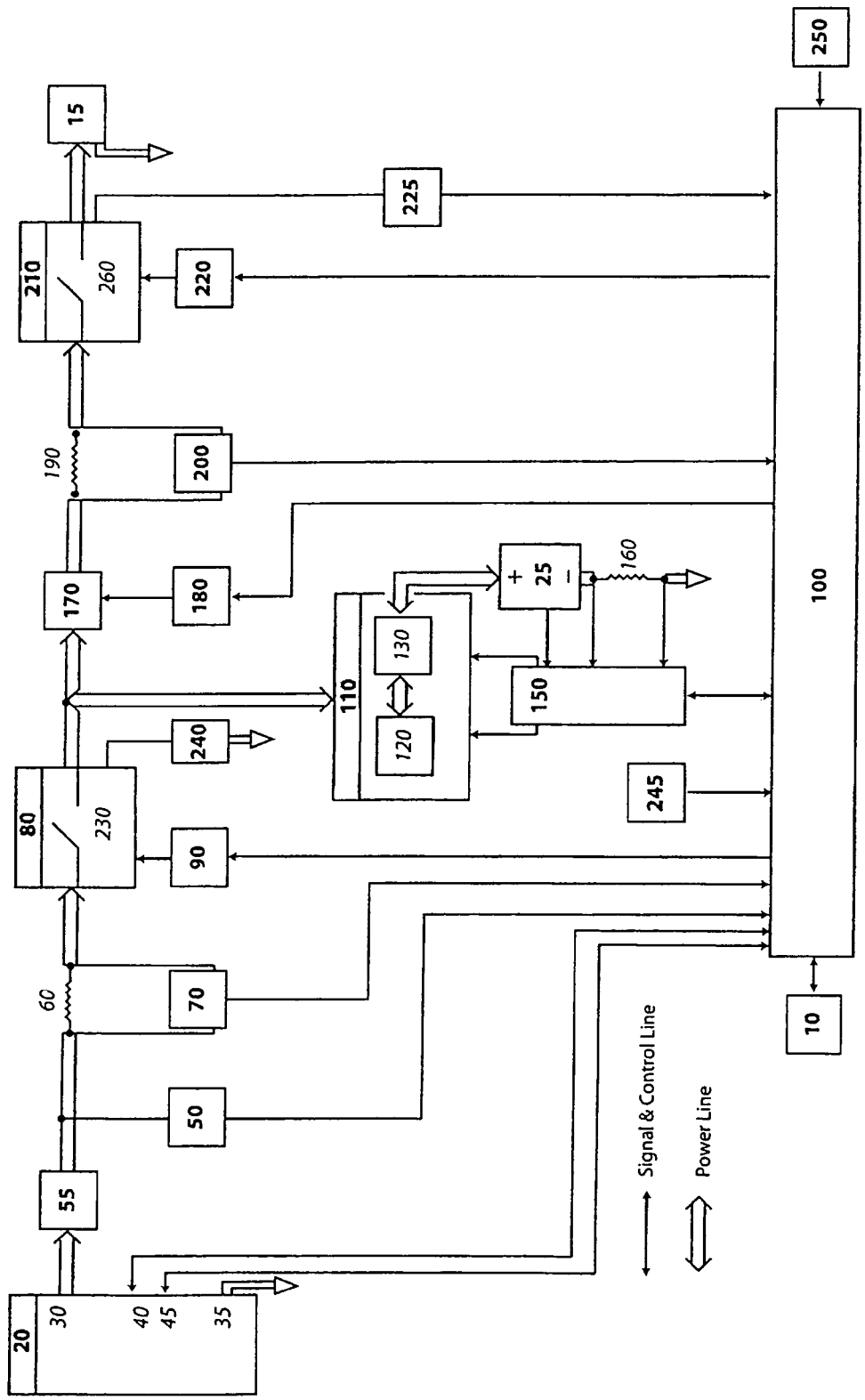
FIG. 3 is a block diagram illustrating the power and signal flows of the power system constructed in accordance with the present invention.

With reference to FIG. 3, and according to one embodiment of the present invention, there are two flows that take place within the power system: the first being the power flows through which the battery 25 is charged and discharged, and the second being the signal flows through which the microcontroller 100 is informed about, and controls, the state of the power system.

With further reference to FIG. 3 and according to one embodiment of the present invention, the power flows relating to the power input into the system occur by means of the input connector 20, which contains a first voltage terminal 30 and a second voltage terminal 35. The input connector 20 also contains a first information terminal 40 and second information terminal 45. When the input connector 20 first connects to a USB port the first and second voltage terminals 30 and 35 electrically connect with the Vbus and GND lines of the USB port, and the first and second information terminals 40 and 45 electrically connect to the differential date lines D+ and D−, as may be appreciated by a person skilled in the art. The input current then flows through the input current sense resistor 60 of the charge current monitor 70 and into the battery charger 80. To the battery charger 80 are coupled a MOSFET switch 110 and a DC/DC converter 170. The MOSFET switch 110 contains a charge switch 120 and a discharge switch 130, in a back-to-back configuration and is connected directly to the battery 25. The input current flows from the battery charger 80 through the MOSFET switch 110 (if the charge switch 120 permits the flow of current) into the battery 25. Power output occurs when current flows out of the battery 25 and ultimately into a portable electronics device that is connected to the output connector 15. The output current passes from the battery 25 through the MOSFET switch 110 (if the discharge switch 130 permits the flow of current) and into the DC/DC converter 170. From the DC/DC converter 170, the current flows across the output current sense resistor 190 of the output current monitor 200 and through an output current limit circuit 210 before passing out of the power system and into the connected electronic device (not shown) by means of the output connector 15. The battery charger 80 contains an internal charge switch 230, which is a MOSFET switch that may pass current (the internal charge switch 230 provides no resistance) or block current flow (the internal charge switch 230 provides infinite resistance), and which may also act as a variable resistance, limiting current flow. Similarly, the output current limit circuit 210 contains an internal output switch 260, also a MOSFET switch that acts as a switch to pass current (no resistance) or block current flow (infinite resistance), and which may also act as a variable resistance, limiting current flow.

With further reference to FIG. 3 and according to one embodiment of the present invention, the signal flows require a first description of the static signal connections. The microcontroller 100 is the control center and is connected to all of the following: the LCD display 10; the first information terminal 40 of the input connector 20; the second information terminal 45 of the input connector 20; the input voltage monitor 50; the charge current monitor 70; the charge current control circuit 90; the battery monitor 150; the output voltage control circuit 180; the output current monitor 200; the output current control circuit 220; the output current limit circuit 210; the over-current flag 225; the system temperature sensor 245; and the reset circuit 250. The battery monitor 150 is connected to the MOSFET switch 110 and its component charge switch 120 and discharge switch 130, as well as the battery 25. The battery charger 80 is connected to the battery temperature sensor 240. The charge current monitor 70 is an operational amplifier which reads the voltage across the input current sense resistor 60 and informs the microcontroller 100 as to the input current using a mathematical relation well known to those skilled in the art. Similarly, the output current monitor 200 is an operational amplifier which reads the voltage across the output current sense resistor 190 and informs the microcontroller 100 as to the output current. The charge current control circuit 90 stores the maximum charge current value and is connected to the battery charger 80, which, through its internal charge switch 230 is able to control the charge current flow. Similarly, the output current control circuit 220 stores the maximum output current and is connected to the output current limit circuit 210, which through its internal output switch 260 is able to control the output current flow.

With further reference to FIG. 3 and according to one embodiment of the present invention, the maximum values of input and output current of the power system depends on the battery's health, that is, the capacity of the battery 25. When the battery 25 is new, it will have the full capacity ("C" value) of, for example, 750 mAh. After extensive use, the battery's C value may be reduced, to, for example, 400 mAh. The battery monitor 150 is constantly aware of the condition of the battery 25, which it reports to the microcontroller 100. The microcontroller 100 programs in real-time the maximum input current value into the charge current control circuit 90, which governs the input current through adjusting a variable resistance within the battery charger 80. Similarly, the maximum discharge current is programmed by the microcontroller 100 in real-time into the output current control circuit 220, which governs the output current through adjusting a variable resistance within the output current limit circuit 210. The microcontroller 100 does this based on a calculation involving comparison of the C value measured by the battery monitor 150 and the original C value of the battery 25. Typically the battery 25 may be charged at a current equal to its present C value, and may be discharged at twice its present C value, these being values which respect the desire for both a long battery life and safe operation. A new battery will be able to withstand charging and discharging currents significantly greater than those that may be withstood by an older battery, and this mechanism prevents a battery from enduring an over-current situation even though it is older and therefore has a reduced C value. The lifespan of lithium ion cells within the battery 25 is reduced when the battery 25 is discharged fully, so the circuitry of the power system stops discharge when 5% of the battery's power remains, which generally occurs at a battery voltage of 3V, so as to keep a small reserve of power. In the interests of protecting the battery 25 from damage from over-discharging, which may cause permanent loss of capacity, the microcontroller 100 monitors the battery voltage from the battery monitor 150, and if the voltage is less than 3V then it signals to the battery monitor 150 to disengage the discharge switch.

With further reference to FIG. 3 and according to one embodiment of the present invention, the MOSFET switch 110, which controls the charging and discharging of the battery, consists of two MOSFET transistors in a back-to-back configuration, which is well-known to a person skilled in the art as producing two switches, in this case, a charge switch 120 and a discharge switch 130. The MOSFET switch 110 operates as a logical 'OR'; it has two inputs, signals which come from the battery monitor 150, which control both the charge switch 120 and discharge switch 130. When both switches are disengaged, the battery neither receives charge current nor outputs output current. When the charge switch 120 is disengaged but the discharge switch 130 is engaged, the battery may not receive current but may output current. When the discharge switch 130 is disengaged but the charge switch 120 is engaged, the battery may receive charge current but may not output current. When both switches are engaged the battery may both receive and output current.

Once the power system is connected through the input connector 20 to a USB port (not shown), the input voltage monitor 50 will recognize a voltage and inform the microcontroller 100. The microcontroller 100 then opens the circuit between the input connector 20 and the battery 25 by signaling to the battery monitor 150 to open the MOSFET switch's 110 charge control switch 120. The power system then identifies the USB port's (not shown) output characteristics using a first process which enumerates the first information terminal 40 and second information terminal 45 of the input connector 20. All computer-bound USB ports produce 5V output, but the current is variable, depending on the port. Once the input connector 20 is connected to a computer's USB port, the first and second information terminals 40 and 45 interface with the D+ and D− outputs on the computer's USB port (not shown). Through the information received by polling the first and second information terminals 40 and 45, the microcontroller 100 is able to determine whether the USB port (not shown) outputs either 100 mA or 500 mA of current.

With further reference to FIG. 3 and according to one embodiment of the present invention, if the input connector 20 is electrically connected to a USB/AC adapter instead of a computer, then the voltage may vary depending on the manufacturer, and the power system uses a second process to determine input voltage, which it commences when the microcontroller 100 does not detect any signal through the first and second information terminals 40 and 45. First, the power system uses the battery charger 80 to limit the input current to an initial value of 50 mA. The input voltage monitor 50 then measures the input voltage and informs the microcontroller 100. Second, the battery charger 80 increases the current draw by another 50 mA, and again the input voltage monitor 50 measures the input voltage. This process is followed incrementally until the input voltage drops by a value of greater than 5%, indicating that the existing input current is equal to or exceeds the USB/AC adapter's (not shown) maximum output current, at which point the microcontroller 100 will signal the battery charger 80 to reduce the input current to the last 50 mA increment before the voltage drop. If there is no voltage drop then the power system incrementally increases the input current until the current drawn by the power system reaches the maximum value of input current for the power system, that stored in charge current control circuit 90 and limited by the internal charge switch 230 of the battery charger 80. Once the appropriate input current is determined, the power system charges the battery 25 until it is fully charged.

With further reference to FIG. 3 and according to one embodiment of the present invention, the temperature is monitored while the power system's battery is being charged. There are two temperature sensors in the power system, a system temperature sensor 245 contained within the battery monitor 150, which reports the system temperature, and a battery temperature sensor 240 connected to the battery charger 80 which reports the battery temperature. If the system temperature sensor 245 registers a temperature outside the range of 0° C. to 40° C., then the battery monitor 150 signals to turn off the charge switch 120 of the MOSFET switch 110. Alternatively, if the battery temperature sensor 240 registers a temperature outside the range of 0° C. to 40° C. then the battery charger 80 turns its internal charge switch 230 off. The battery temperature sensor 240 is essentially a thermal resistor wherein the resistance is reduced as the temperature increases. Since there is a constant current flowing through this resistor, and a voltage meter attached, when the voltage increases the battery temperature sensor 240 knows that the temperature is increasing as well, and will inform the battery charger 80, which will turn off the internal charge switch 230.

With further reference to FIG. 3 and according to one embodiment of the present invention, when the power system is connected to a portable electronics device (not shown) by means of an adapter 12 connected to the power system's output connector 15, it prepares to discharge the battery 25 into the portable electronics device. First, the microcontroller 100 triggers a discharge signal to the MOSFET switch 110, which turns on the discharge switch 130 and permits current to flow out of the battery 25, through the DC/DC converter 170 and into the portable electronics device (not shown) by means of the output connector 15 and adapter 12. An output current sense resistor 190 is connected in series at the output of the DC/DC converter 170, and the output current monitor 200, an operational amplifier, reports the current across the output current sense resistor 190 constantly, thereby informing the microcontroller 100 as to the output current of the DC/DC converter 170.

With further reference to FIG. 3 and according to one embodiment of the present invention, in order to increase efficiency, the lowest output voltage that charges the portable electronics device (not shown) at its maximum charging rate should be used. The DC/DC converter 170 outputs an initial voltage of 5V, and the portable device (not shown) will draw a certain current at that voltage. If the current drawn exceeds a maximum amount, specified as twice the battery's present C value in the output current control circuit 220, for example, 1400 mA in the case of a new battery, then the output current limit circuit 210 will detect this and signal by means of the over-current flag 225 to the microcontroller 100. The output current limit circuit 210 will then reduce the current flowing out of the power system by using its internal output switch 260 to increase the internal resistance. However, this will create a significant quantity of heat and inefficiency as the power is dispersed across the increased internal resistance of the output current limit circuit 210. Therefore, as a result of the over-current flag 225 signal received by the microcontroller 100, the latter will signal the DC/DC converter 170 to lower the voltage at its output by an increment of 0.2V. If the output current limit circuit 210 determines that the current still exceeds the value set in the output current control circuit 220, then it continues to present the over-current flag 225 to the microcontroller 100, which continues to signal the DC/DC converter 170 to lower the voltage at its output by an increment of 0.2V. This iterative voltage reduction continues until the output current limit circuit 210 no longer detects an over-current condition, at which point it will change the signal it gives to the microcontroller 100 from low to high, and the microcontroller 100 no longer signals the DC/DC converter 170 to reduce its output voltage. The benefits of managing output over-voltage in this way are to protect the battery 25 from overcurrent and to increase efficiency of the power system by reducing energy wasted as heat is dispersed over the output current limit circuit 210.

With further reference to FIG. 3 and according to one embodiment of the present invention, as the portable electronics device (not shown) becomes charged, its voltage increases. As a result, the current flowing into the portable device (not shown) also is reduced as the voltage differential between the output voltage from the DC/DC converter 170 and the portable device (not shown) is reduced. If the current falls below 400 mA, an under-current condition results. The output current limit circuit 210 contains a comparator which detects this and sends an over-current flag 225 to the microcontroller 100, which in turn signals the DC/DC converter 170 to increase the voltage incrementally by 0.2V. The incremental increase continues until the current exceeds the maximum output current value stored in output current control circuit 220, at which point the microcontroller 100, which receives an over-current flag 225 from the output current limit circuit 210 at this point, signals to the DC/DC converter 170 to reduce the voltage to the previous increment, or until the voltage reaches its maximum value of 5V and the output current limit circuit 210 stops showing the over-current flag 225 to the microcontroller 100. At this point the current may do no more than "trickle" into the portable device's battery (not shown). A "trickle" charge means that a value of current of approximately 50 mA will continue to charge the portable device (not shown). "Trickling" may occur when the portable device's battery is full or if the portable device contains a charge-limiting circuit. It continues to charge the battery slowly, and stops when the portable device no longer accepts current.

With further reference to FIG. 3 and according to one embodiment of the present invention, the power system also reduces excess voltage at the DC/DC converter 170 output where possible. The microcontroller 100 monitors the current through the output current monitor 200, and reduces the voltage output by the DC/DC converter incrementally so long as the current remains constant. When an incremental voltage reduction results in a drop of 5% or more of the current, the microcontroller 100 will signal the DC/DC converter 170 to revert to the previous incremental voltage value.

Many modifications and other embodiments of the invention will come to the mind of one skilled in the art having the benefit of the teachings presented in the foregoing description and associated drawings. Therefore, it is understood that the invention is not to be limited to the specific embodiment disclosed, and that modifications and embodiments are intended to be included within the scope of the appended claims.

We claim:

1. A method for maximizing the efficiency of a power system, comprising the steps of:
   providing a current source having an input current to the power system;
   limiting the input current to an initial value;
   monitoring an input voltage to the power system;
   incrementally increasing the input current while the input voltage is monitored;
   upon the occurrence of a decrease of the input voltage, reducing the input current from the highest reached current value to the immediately previously reached highest value of the input current; and
   maintaining the input current at the immediately previously reached highest value of the input current;
   wherein an overcurrent signal only occurs upon the occurrence of a decrease of the input voltage.

2. The power system of claim 1 wherein the initial value of the input current is between 0 mA and 2 A.

3. The power system of claim 1 wherein the initial value of the input current is adjustable.

4. The power system of claim 1 wherein the decrease of the input voltage is between 0% and 10% of the input voltage.

5. The power system of claim 1 wherein the decrease of the input voltage is adjustable.

6. The power system of claim 1 wherein the incremental increase of the input current is between 0 mA and 500 mA.

7. The power system of claim 1 wherein the incremental increase of the input current is adjustable.

8. A method that maximizes the efficiency of a power system, comprising the steps of:
- limiting an output voltage of the power system to an initial value;
- monitoring an output current of the power system;
- upon the occurrence of the output current exceeding a maximum value, reduce the output voltage by an increment;
- upon the occurrence of the output current falling below a minimum value, increase the output voltage by an increment, limited by a maximum output voltage value;
- upon the occurrence of the output current value appearing between the minimum value and the maximum value, where the output current is not changing, reduce the output voltage by an increment; and
- upon the occurrence of the output current value appearing between the minimum value and the maximum value, where the output current is changing, increasing the output voltage by an increment.

9. The power system of claim 8 wherein the initial value of the output voltage is between 0V and 20V.

10. The power system of claim 8 wherein the initial value of the output voltage is adjustable.

11. The power system of claim 8 wherein an incremental change in the output voltage is between 0V and 1V.

12. The power system of claim 8 wherein an incremental change in the output voltage is adjustable.

13. The power system of claim 8 wherein the maximum value of output current is between 0 mA and quadruple a battery'capacity value.

14. The power system of claim 8 wherein the maximum value of output current is adjustable.

15. The power system of claim 1, the method further comprising the steps of:
- determining the full capacity value of the battery in a new state;
- calculating the capacity value of the battery by charging and discharging said battery and monitoring the current, voltage and time;
- calculating a maximum charge current and a maximum discharge current to maximize a health of the battery;
- limiting an input current to the maximum charge current; and
- limiting an input current to the maximum discharge current.

16. The power system of claim 15 wherein the maximum charge current is between 0 mA and double the battery's capacity value.

17. The power system of claim 15 wherein the maximum charge current is adjustable.

18. The power system of claim 15 wherein the maximum discharge current is between 0 mA and triple the battery's capacity value.

19. The power system of claim 15 wherein the maximum discharge current is adjustable.

* * * * *